US006019087A

United States Patent [19]

Graves

[11] Patent Number: 6,019,087

[45] Date of Patent: Feb. 1, 2000

[54] FUEL REGULATOR

[76] Inventor: Scott M. Graves, 8439 Eureka St., Ventura, Calif. 93004

[21] Appl. No.: 09/061,012

[22] Filed: Apr. 15, 1998

[51] Int. Cl.[7] ........................ F02K 31/36

[52] U.S. Cl. ........................ 123/463

[58] Field of Search ........................ 123/457, 460, 123/462, 463, 382, 383; 251/61.3, 907

[56] References Cited

U.S. PATENT DOCUMENTS

| | | | |
|---|---|---|---|
| 5,101,793 | 4/1992 | Sample | 123/463 |
| 5,211,205 | 5/1993 | Grant et al. | 123/457 |
| 5,785,023 | 7/1998 | Cross | 123/463 |

*Primary Examiner*—Thomas N. Moulis
*Attorney, Agent, or Firm*—E. Roderick Cline

[57] ABSTRACT

A supplemental regulator used with a supercharged engine, a push rod, couples to a primary regulator. One side of a diaphragm of the supplemental regulator sees boost pressure of the supercharger. The other side of the diaphragm sees atmospheric pressure and fuel pressure sensed through the primary regulator diaphragm. A push rod couples the supplemental regulator diaphragm to a primary regulator diaphragm. Boost pressure above the diaphragm increases the force on a return bypass valve of the primary regulator. The bypass valve sees intake pressure and spring force that works on the top of the standard regulator diaphragm, and fuel pressure and that acts on the bottom of the diaphragm. When the supercharger is not providing boost, vacuum exists above the supplemental diaphragm, which lifts it and uncouples the supplemental regulator from the primary regulator. The primary regulator then takes over and maintains standard fuel pressure to the engine's injectors. The primary regulator returns fuel to the tank through the fuel outlet means when fuel pressure exceeds a predetermined set amount.

6 Claims, 2 Drawing Sheets

FUEL REGULATOR

BACKGROUND OF THE INVENTION

The present invention relates in general to the art of fuel regulators, and more in particular, to such regulators as used with internal combustion engines.

Many of today's internal combustion engines are supercharged. In fuel injected, supercharged engines, fuel drawn by a fuel pump from a fuel tank goes to a fuel rail. The fuel rail supplies the injectors of an engine. Fuel demand is a function of engine speed and load, and resulting vacuum.

A regulator determines the amount of fuel the injectors receive, and that amount is a function of demand. The regulator has a spring loaded diaphragm, and a bypass valve. The diaphragm separates the interior of the regulator into fuel and spring chambers. The bypass valve passes fuel out of the fuel chamber through a fuel passage, say a nipple. Fuel enters the chamber through a different passage, say different nipples. The spring chamber houses the spring and sees manifold pressure. The spring tends to close the bypass valve, and prevent fuel from leaving the chamber. The fuel chamber sees fuel pressure, which opposes the spring force and tends to open the bypass valve. As vacuum increases the net bypass valve closing force on the diaphragm decreases, and when fuel pressure in the rails exceeds a preset value, the force of the fuel pressure unseats the bypass valve, and fuel returns to the fuel tank. Thus, fuel pressure to the engine is regulated.

The result of this regulation is a compensation of in a 1:1 relationship. Thus, an increase in supercharger boost pressure of 5 psi. results in an increase of fuel pressure of 5 psi.

It is highly desirable to increase fuel pressure as boost pressure increases at a rate sufficient to compensate for an increased air flow rate of a supercharged engine.

It is also highly desirable to return to standard fuel pressure settings and regulation when augmented fuel pressure is not needed.

SUMMARY OF THE INVENTION

My supplemental regulator works in conjunction with a primary regulator to increase fuel pressure as boost pressure (demand) increases, and which returns regulation completely to the primary regulator when increased demand is not necessary. It also readily adapts to different desired boost pressure fuel delivery values. The primary regulator may be a "stock" production regulator or a stage of regulation provided by a regulator integrated with my supplemental regulator.

I provide a supplemental regulator assembly that includes a body or housing, a diaphragm, a push rod, means to mount the supplemental regulator onto the primary regulator, and means to couple the two together. One side of my diaphragm sees boost or vacuum pressure. The other side of the diaphragm sees atmospheric pressure. It also sees through the coupling means fuel pressure sensed through the primary regulator diaphragm. The push rod couples the supplemental regulator diaphragm to of the primary regulator diaphragm. Boost pressure above my diaphragm increases the force on the return bypass valve of the primary regulator. The bypass valve still sees the forces from the standard regulator diaphragm. These forces are intake pressure boost or vacuum and spring force that works on the top of the standard regulator diaphragm, and fuel pressure and that acts on the bottom of the diaphragm. When the supercharger is not providing boost, vacuum exists above the supplemental diaphragm, which lifts and uncouples the supplemental regulator from the primary regulator. The primary regulator then takes over maintaining standard fuel pressure to the injectors. As before, the primary regulator returns fuel to the tank through the fuel outlet means when fuel pressure exceeds a predetermined set amount.

In greater particular, my regulator includes the housing having a hollow interior, the diaphragm at the upper end of the interior, the push rod extending axially through the interior, and a cover for the diaphragm end of the housing. Fastener means attach the cover to the housing. The housing attaches at its bottom to the primary regulator. Connection means for a source of boost pressure or vacuum, such as a nipple leads, to the chamber above the supplemental regulator diaphragm. Boost pressure creates a force that acts down on this diaphragm and through the push rod onto the primary regulator diaphragm and the bypass valve, and tends to close it. Fuel pressure acting through the primary regulator diaphragm opposes this spring force and the force of boost The push rod extends through a sleeve to a spring cup of the primary regulator and receives a coupling shaft that acts directly on primary diaphragm.

Under vacuum, the push rod retracts to uncouple my regulator from the primary regulator, and that regulator maintains fuel pressures at standard primary set values.

These and other features aspects and advantages of the present invention will become more apparent from the following description claims and drawings

DESCRIPTION OF THE PREFERRED EMBODIMENT

Figure 1:
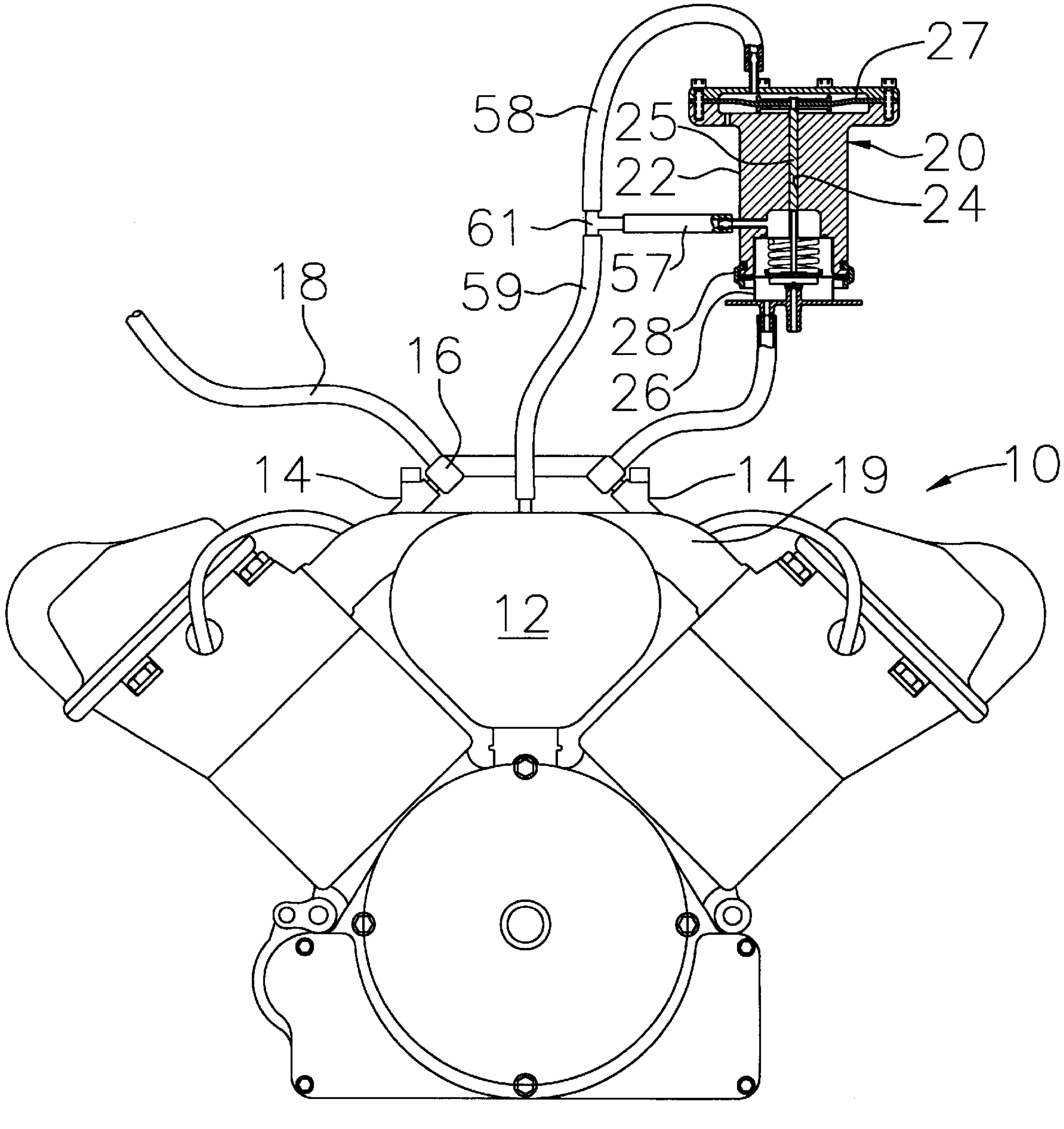
FIG. 1 is an elevational view, partly in half section, of the regulator of the present invention as used with a fuel injected and supercharged, internal combustion engine and standard regulator.

With reference initially to FIG. 1, I show the over all organization of my invention. A supercharged internal combustion engine 10 has a super charger 12, a plurality of fuel injectors 14, a fuel rail 16, a fuel line 18, and a manifold 19.

My improved supplemental regulator is shown by reference numeral 20. It has a right cylindrical housing or body 22. An axial bore 24 extends through the body. An axially disposed push rod 25 extends through axial bore 24. A diaphragm 27 attaches to the upper end of the push rod.

Figure 2:
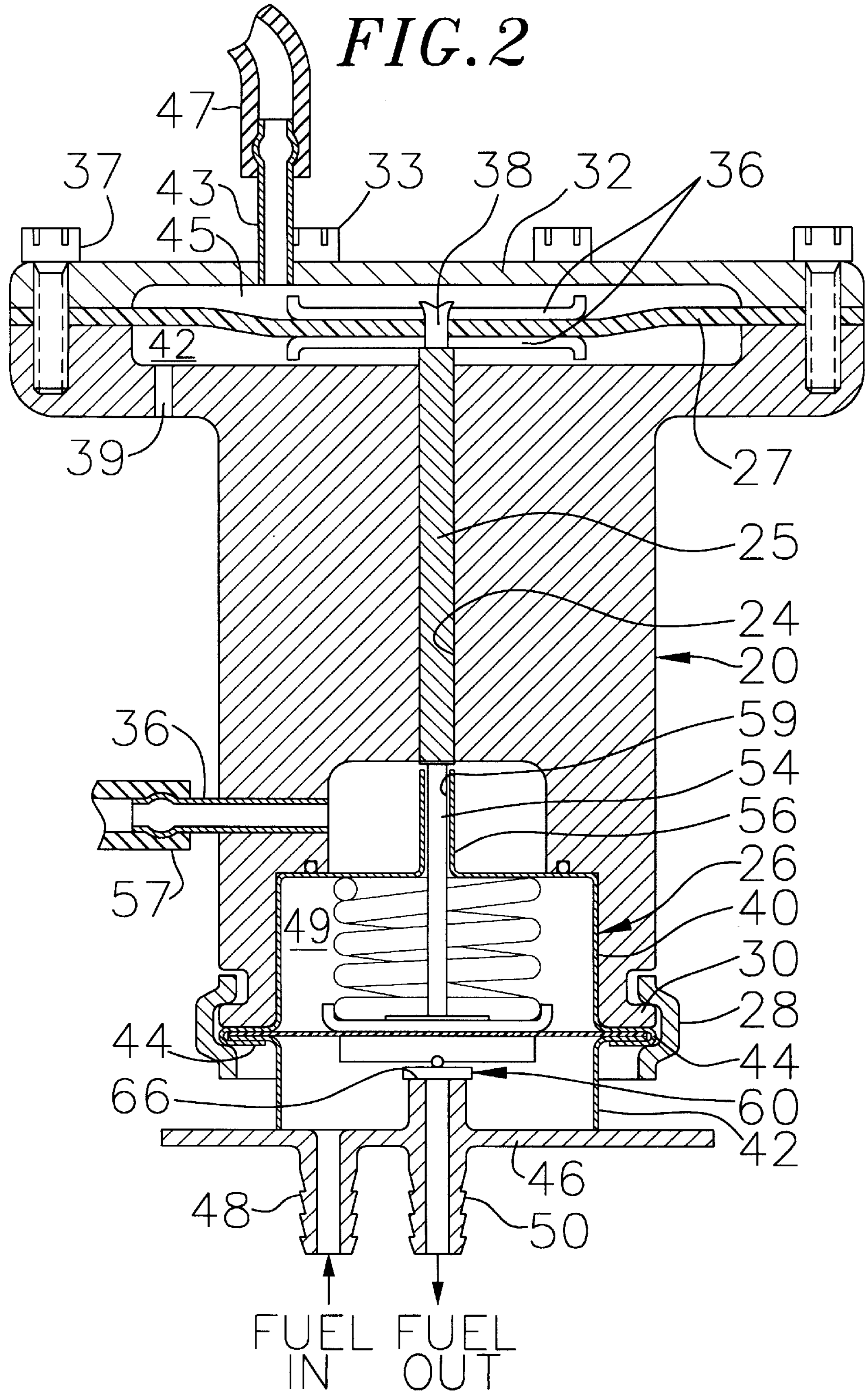
FIG. 2 is an elevational view, again partly in half section, of the supplemental regulator of my invention and a standard primary regulator.

As seen best on FIG. 2, supplemental regulator 20 mounts onto a primary regulator 26 through a band clamp 28 that circumscribes the bottom of the supplemental regulator and mounts over a flange 30 there. As I mentioned earlier, the primary regulator can be a stage of regulation or a "stock" or production regulator.

A cover 32 of the supplemental regulator together with the primary regulator 26 close the supplemental regulator. The cover mounts to body 22 through a plurality of fasteners 34. Washers like stiffeners 36 embrace diaphragm 27. They and the diaphragm are staked or bolted to push rod 25 at 38. The stake is an extension of the push rod. A vent 39 through housing 20 leads to a chamber 42 under diaphragm 27. A nipple 43 in cover 32 leads to a chamber 45 above diaphragm 27. A boost/vacuum source line 47 leads provides boost/vacuum to chamber 45.

As seen best in FIG. 2, primary regulator 26 has a housing 40 that includes a right cylindrical medial section 42. The housing and medial sections join at reentrant flanges 44. Band clamp 28 extends under these flanges from its purchase on flange 30. The medial section attaches to a base 46. A fuel-inlet nipple 48 through the base passes fuel into fuel chamber 51 of the primary regulator. A fuel outlet nipple 50 passes fuel from the primary regulator back to a fuel tank (not shown).

An end 54 of push rod 25 extends through a nipple 56. Boost/vacuum pressure reaches chamber 49 through an annular clearance between the pin and the sleeve.

A nipple 56 extends through the wall supplemental regulator 20 and into chamber 51 of primary regulator 26. This nipple connects by a line 57 to boost and vacuum source 19, the intake manifold.

FIG. 1 shows these boost/vacuum lines best. Boost/vacuum pressures reach chambers 45 and 49 through lines 57 and 58 that tee into a line 59 to the boost/vacuum source at a tee 61.

A spring 60 reacts between a diaphragm 62 and a top wall 65 of housing 40 of primary regulator 26. The spring is in a chamber 49 of the housing. The spring provides a force that opposes fuel pressure acting on the bottom of diaphragm 62. As such, spring 60 biases a bypass valve 64 closed against a seat 66. When fuel pressure in chamber 51 exceeds a predetermined amount, valve 64, lifts from its seat and fuel returns to the fuel tank from chamber 51, thus pressure of fuel available for delivery to the engine and decreasing demand.

Housing 22 slips over housing 40 of primary regulator 26. An O-ring 68 seals interior of housing 40 ambient air.

In operation before my supplemental regulator starts to operate, as demand increases manifold vacuum decreases and the vacuum in chamber 49 of primary regulator 26 tends to unseat bypass valve 64. At a value determined by the spring constant of spring 60 and the spring's compression, the spring has insufficient force to resist the force produced by fuel pressure in chamber 51 and vacuum in chamber 49. These forces will unseat valve 66 and fuel will return to the fuel tank.

My regulator supplements this operation. Without supercharger pressure in chamber 45, push rod 25 uncouples from the primary regulator and the primary regulator alone controls fuel delivery. Boost pressure in chamber 45 produces a force through diaphragm 27 that adds to that produced by primary regulator diaphragm 60 and spring force tending to close bypass valve 64. Thus, fuel pressure compensation is not fixed by primary regulator 26. It depends on both my supplemental regulator and the primary regulator.

I have described the presently preferred embodiment of my invention. The spirit and scope of the present invention should not necessarily be limited to the appended claims.

I claim:

1. A supplemental regulator for use in combination with a primary regulator to regulate fuel pressure to a fuel injected, supercharged, internal combustion engine of the type having an intake manifold, fuel injectors, fuel rails to the injectors, the primary regulator functioning to control a supply of fuel to the injectors, the primary regulator having a fuel chamber, a fuel inlet to the chamber, a fuel outlet from the chamber, a diaphragm, a spring acting on the diaphragm to bias it toward the fuel chamber, a spring chamber housing the spring, a bypass valve in the fuel outlet to pass fuel from the fuel chamber to a fuel tank, the supplemental regulator comprising:

a) a body having a first and a second end, and a chamber at the first end;

b) a diaphragm at the first end dividing the first end chamber into a manifold pressure sensing chamber and a second chamber;

c) manifold pressure port means into the interior of the body to communicate the manifold chamber with the intake manifold of the engine of the engine to sense manifold pressure;

d) a push rod axially disposed in the body;

e) means to attach the second end of the supplemental regulator to the primary regulator; and f) means to couple the push rod to the diaphragm of the primary regulator, fuel pressure in the fuel chamber opposing manifold pressure in the manifold pressure chamber of the supplemental regulator, whereby, when a vacuum exists in the manifold chamber, the supplemental regulator diaphragm moves and translates the push rod to uncouple it from the primary regulator diaphragm and permit fuel pressure in the fuel chamber to unseat the bypass valve.

2. The supplemental regulator claimed in claim 1 including a removable cover attached to the body at the first end to permit access to the supplemental regulator diaphragm.

3. The supplemental regulator claimed in claim 2 wherein the mounting means includes a flange at the second end of the body, and a clamp band acting between the flange and the primary regulator.

4. The supplemental regulator claimed in claim 3 including a port into the second chamber of the supplemental regulator on the side of the supplemental regulator opposite the manifold pressure port means.

5. The supplemental regulator claimed in 4 wherein a manifold pressure connection means extends through the body proximate the second end to the spring chamber of the primary regulator.

6. The supplemental regulator claimed in claim 5 including stiffeners on each side of the supplemental diaphragm.

* * * * *